Aug. 10, 1965    R. N. BURNS ETAL    3,199,624
BATTERY RETAINER
Filed Aug. 23, 1963    2 Sheets-Sheet 2

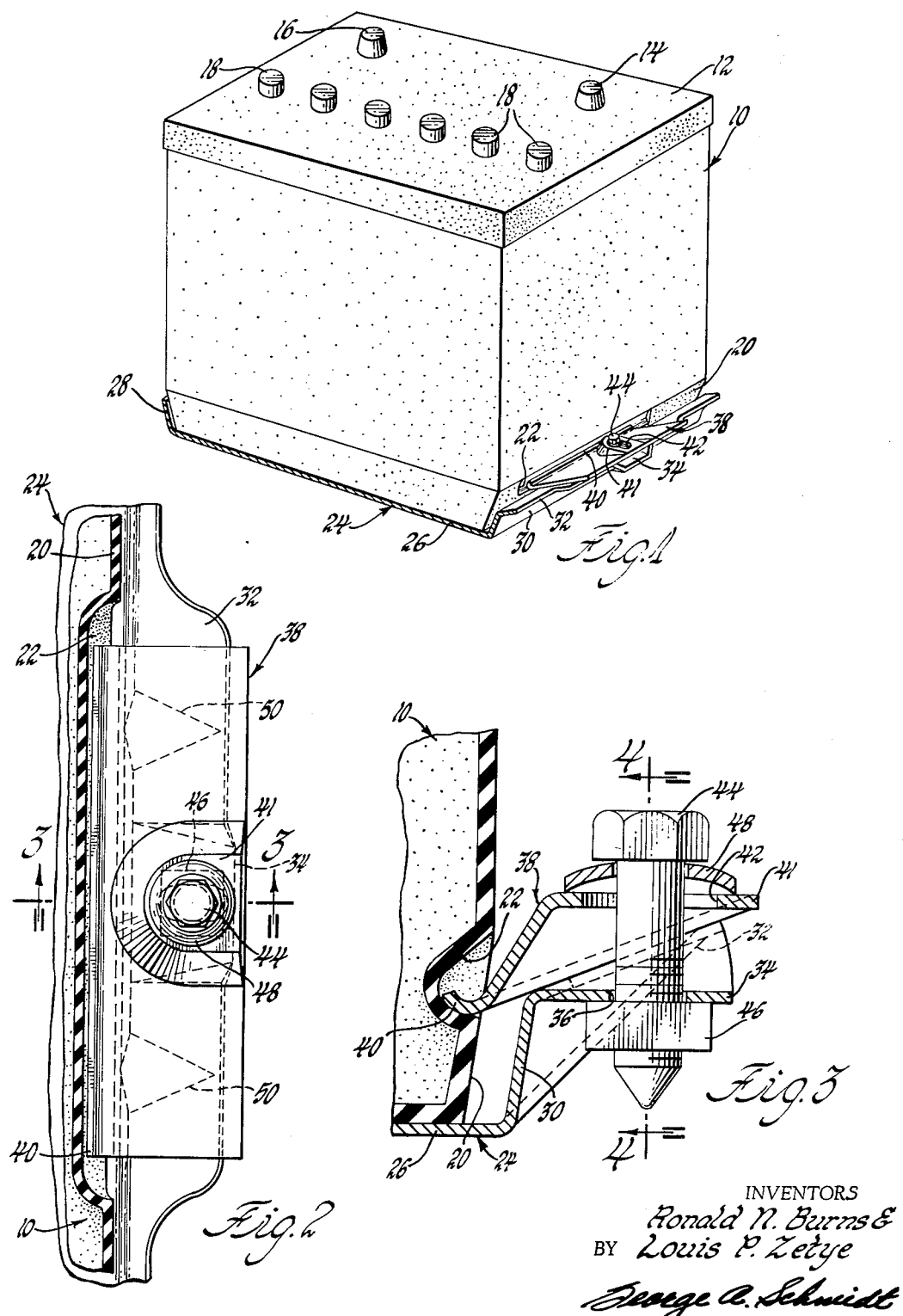

INVENTORS
Ronald N. Burns &
BY Louis P. Zetye

George A. Schmidt
ATTORNEY

United States Patent Office 3,199,624
Patented Aug. 10, 1965

3,199,624
BATTERY RETAINER
Ronald N. Burns, Utica, and Louis P. Zetye, Birmingham, Mich., assignors to General Motors Corporation, Detroit, Mich., a corporation of Delaware
Filed Aug. 23, 1963, Ser. No. 304,093
4 Claims. (Cl. 180—68.5)

This invention relates to storage batteries, and more particularly to a means for retaining a storage battery in a structure such as a motor vehicle.

In the design, manufacture and operation of many devices, such as motor vehicles, it is desirable to mount a storage battery therein for operation of the device. In a motor vehicle, for example, the storage battery is mounted somewhere in the engine compartment and provides the necessary electric power to start the engine and to operate certain accessories.

It is generally the practice to mount such storage batteries by means of a retainer member extending around the outer periphery of the upper surface of the battery or by a retainer member extending across the upper surface of the battery. These retainer members are held to a battery tray or to the adjacent structure by means of tie bolts or other fastening means. With such retainers, and because of their adjacency to the battery terminals and battery filler plugs, the retainers often become corroded, presenting an unsightly appearance and in time they may become substantially weakened.

It is proposed to overcome these problems by securing the storage battery to the battery tray at the bottom of the battery by means of a retainer member received in a suitable groove formed adjacent the lower edge of the battery. The device in which this invention is embodied comprises, generally, a retainer member angularly disposed relative to the tray and to the battery, and receivable in a groove suitably formed in the battery casing. Fastening means are provided to secure the retainer member directly to the tray in such a manner as to provide a component of force in the direction of the battery to both secure the battery in the tray and to secure the retainer member in the groove.

By placing the retaining means adjacent the lower surface of the battery the corrosion problem is avoided and the battery is more securely retained in the battery tray and thus in the using structure. By virtue of the angular disposition of the retainer member the retention is more secure than has been heretofore possible.

These and other advantages will become more apparent from the following description and drawings, in which:

FIGURE 1 is a perspective view of a typical storage battery and mounting means, with parts broken away and in section to illustrate the position of the various parts;

FIGURE 2 is a plan view of a portion of the battery and mouting illustrated in FIGURE 1, showing the position of the parts of the retainer means;

FIGURE 3 is a cross-sectional view of the retention means shown in FIGURES 1 and 2, taken substantially along the line 3—3 of FIGURE 2, and looking in the direction of the arrows;

Figure 4:
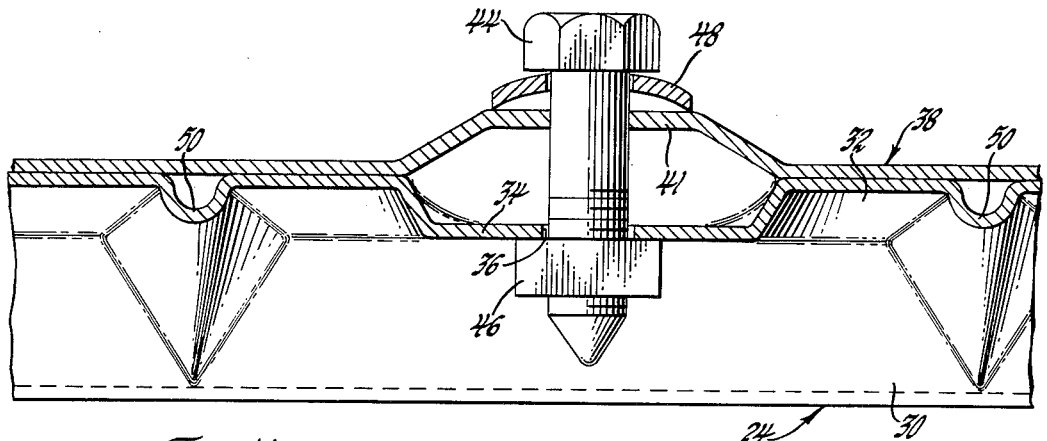
FIGURE 4 is a cross-sectional view of the battery retainer means shown in FIGURES 1-3, taken substantially along the line 4—4 of FIGURE 3, and looking in the direction of the arrow.
Figure 5:
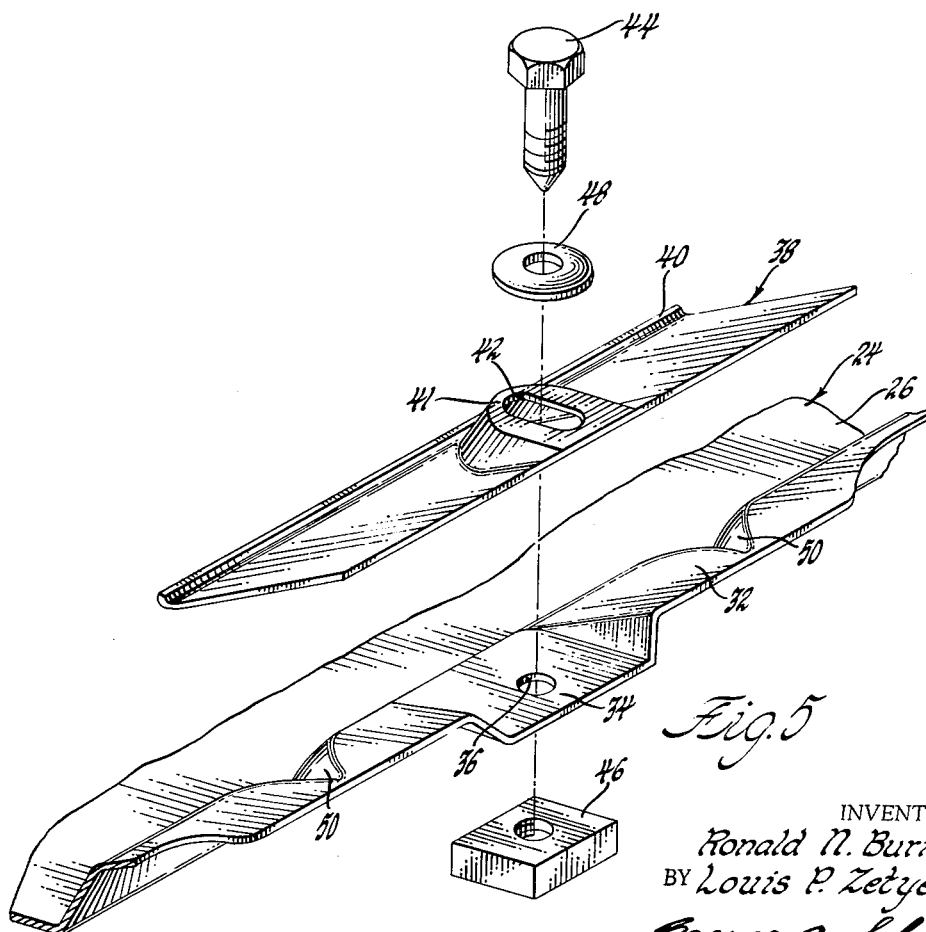
FIGURE 5 is an exploded perspective view of the battery tray and battery retainer member showing the manner in which the parts are secured together.

Referring more particularly to the drawings, FIGURE 1 best illustrates the over-all storage battery mounting installation. A typical storage battery, illustrated generally by the numeral 10, is provided with an outer casing enclosing the inner operating parts of the battery. The upper plate 12 has projecting therethrough the usual terminals 14 and 16 and receives the usual filler plugs 18. One lower edge 20 of the battery casing is provided with a groove 22 which receives the retainer means in a manner to become hereinafter more apparent.

The battery 10, when installed, is mounted in a battery tray, illustrated generally by the numeral 24. Tray 24 includes a planar portion 26 on which the battery 10 rests. Around the periphery of the planar portion 26 is an upturned flange 28 surrounding the battery 10 on three sides and locating and retaining the battery in the tray in conjunction with the retainer means to be later described.

At the front edge of the tray 24, that is, the edge adjacent the wall of the battery 10 having the groove 22 formed therein, is an upstanding wall 30. Wall 30 has an angularly, outwardly disposed flange 32 which provides a ramp directed toward the groove 22 formed in the battery wall 20. A portion 34 of the ramp flange 32, and preferably toward the middle thereof, is formed out of the surface of the ramp flange 32 to lie generally parallel with the planar portion 26 of the tray 24. A bolt receiving aperture 36 is formed in the portion 22 for purposes to become hereinafter more apparent.

Overlying and engaging the ramp flange 32 is a retainer member, illustrated generally by the numeral 38. Retainer member 38 may be provided with a rolled edge 40 which is received in the groove 22 formed in the wall 20 of the battery 10. Retainer member 38 is generally planar and is provided with a portion 41, preferably toward the middle thereof, which is formed out of the plane of the retainer member 38 so that it lies substantially parallel to the portion 34 of the ramp flange 32. Portion 41 is provided with an aperture or slot 42 for purposes to become hereinafter apparent. It may be seen that in the mounting of the retainer member 38 on the ramp flange 32 the forward edge 40 will be directed toward the groove 22 in the battery 10 by the angular disposition of the ramp flange 32.

In order to secure the retainer member 38 to the tray 24 at the ramp flange 32, suitable fastening means, such as bolt 44 and nut 46, may be provided. Bolt 44 is received in the aperture 42 in the portion 41 of the retainer member 38 and passes therethrough to the aperture 36 formed in the portion 34 of the ramp flange 32. A suitable lock washer 48 may be provided between the bolt head and the retainer member 38.

In the mounting of the battery 10 in the battery tray 24 and in the securement thereof by the retainer means it may be seen that as the nut 46 is tightened on bolt 44 a component of force is provided in the direction of the ramp angle of the ramp flange 32. This tends to cause the retainer member 38 to slide down the ramp flange 32 to jam the forward edge 40 of the retainer member in the groove 22. At the same time this force causes the retainer member 38 through the leading edge 40 to push the battery 10 toward the rear of the battery tray 24 and securely against the upstanding flange 28. This securely locks the battery in place in the battery tray and thus in the structure with which it is used. To permit this positive engagement the aperture 42 may be slightly elongated as shown in the drawings to permit a limited amount of sliding movement of the retainer member 38 as the nut 46 is tightened.

It may be desirable to strengthen the ramp flange 32 of the battery tray 24, and this strengthening may be provided by suitable ribs 50 formed in the surface of the ramp flange 32. Any suitable strengthening means may be provided and the ribs may be disposed at any point along the length of the ramp flange 32.

Thus, a battery installation is provided which is positive and secure, and which avoids the corrosion problems attendant to battery mountings at the upper surface of the battery. The retainer member and its angular disposition provides secure engagement of the battery within the battery tray and as long as the fastening means are properly tightened the tendency is to maintain this secure engagement.

What is claimed is:

1. Battery retainer means for a battery having a groove adjacent the lower edge thereof and comprising:
a tray having a battery receiving surface and an angularly outwardly extending flange along one edge thereof, said flange forming a ramp adjacent said groove in said battery, a portion of said flange being formed out of the plane of said flange and substantially parallel to said battery receiving portion of said tray; a substantially planar retainer member lying slideably upon said flange, said retainer having an edge receivable in said groove in said battery and having a portion formed out of the plane thereof and substantially parallel to said portion of said flange; and means for securing said retainer member to said flange at said portions and with said edge of said retainer member in secure engagement in said groove in said battery.

2. Battery retainer means for a battery having a groove adjacent the lower edge thereof and comprising:
a tray having a flat battery receiving surface, an upstanding wall along an edge of said tray adjacent said groove, an upwardly and outwardly turned flange contiguous with said upstanding wall, said upstanding wall being spaced adjacent said groove and of sufficient height so that the projected surface of said upwardly and outwardly turned flange intersects said groove, a substantially planar retainer member having an edge receivable in said groove lying slideably upon said upwardly and outwardly turned flange, and fastener means for securing said retainer member to said tray with said edge of said retainer in said battery to hold said battery on said tray.

3. Battery retainer means for a battery having a groove adjacent the lower edge thereof and comprising:
a tray having a flat battery receiving surface, an upstanding wall along an edge of said tray adjacent said groove, an upwardly and outwardly turned flange contiguous with said upstanding wall and having an apertured portion formed out of the plane thereof and substantially parallel to said battery receiving surface, said upstanding wall being spaced adjacent said groove and of sufficient height so that the projected surface of said upwardly and outwardly turned flange intersects said groove, a subtantially planar retainer member having an edge receivable in said groove lying slideably upon said upwardly and outwardly turned flange, said retainer member having an apertured portion formed out of the plane thereof and substantially parallel to said apertured portion of said flange;
and fastener means for securing said retainer member to said flange and passing through said apertured portions, whereby tightening said fastener means creates a component of force parallel to said upwardly and outwardly turned flange to tend to force said edge of said retainer member into said groove in said battery.

4. Battery retainer means as described in claim 3 wherein one of the said portions is elongatedly apertured in a direction substantially perpendicular to said groove whereby tightening of said fastener means tends to slide said retainer down said flange toward said battery.

References Cited by the Examiner
UNITED STATES PATENTS

| | | | |
|---|---|---|---|
| 2,947,373 | 8/60 | Wilson | 180—68.5 |
| 2,980,195 | 4/61 | Herbst | 180—68.5 |
| 3,053,336 | 9/62 | Zednik | 180—68.5 |
| 3,105,566 | 10/63 | Raney et al. | 180—68.5 |

A. HARRY LEVY, *Primary Examiner.*